United States Patent [19]

Hurwitz

[11] 3,965,455

[45] June 22, 1976

[54] FOCUSED ARC BEAM TRANSDUCER-REFLECTOR

[75] Inventor: Michael J. Hurwitz, Pittsburgh, Pa.

[73] Assignee: The United States of America as represented by the Secretary of the Navy, Washington, D.C.

[22] Filed: Apr. 25, 1974

[21] Appl. No.: 464,281

[52] U.S. Cl. .................................. 340/8 R; 310/8.2; 310/8.5; 310/9.1; 340/8 FT; 340/10; 343/840

[51] Int. Cl.² .......................................... H04B 13/00

[58] Field of Search ........... 343/837, 838, 840, 910, 343/914; 340/8 R, 9, 10, 8 FT, 8 L, 11, 12, 13; 310/8, 2, 8.5, 8.6, 9.1; 73/67.8 R, 67.8 S, 71.5 US; 350/294

[56] References Cited

UNITED STATES PATENTS

| | | | |
|---|---|---|---|
| 2,228,024 | 1/1941 | Abrahams | 340/8 FT |
| 2,342,721 | 2/1944 | Boerner | 343/838 |
| 2,370,053 | 2/1945 | Lindenblad | 343/838 |
| 2,855,526 | 10/1958 | Jones | 340/10 UX |
| 3,209,361 | 9/1965 | Webb | 343/914 |
| 3,241,147 | 3/1966 | Morgan | 343/914 |
| 3,262,307 | 7/1966 | Hart | 73/71.5 US |
| 3,325,779 | 6/1967 | Supernaw et al. | 340/10 |
| 3,451,260 | 6/1969 | Thurstone | 340/8 L |

OTHER PUBLICATIONS

"The Journal of the Acoustical Society of America", vol. 21, No. 5, Sept. 1949, pp. 471–481, Refracting Sound Waves.

"Related Experiments with Sound Waves and Electromagnetic Waves", Kock from Proceedings of the IRE, July 1959, vol. 47, No. 7, pp. 1192–1201.

*Primary Examiner*—Harold Tudor

*Attorney, Agent, or Firm*—R. S. Sciascia; Q. E. Hodges

[57] ABSTRACT

An acoustic transducer-reflector using a single disc-shaped piezoceramic element radiating into a compound reflector for obtaining a line focus sound beam that is characteristic of focused-arc transducers that maybe used for underseas applications and for non-destructive materials testing. The single transducer emits acoustic energy into the compound reflector which reshapes a circular beam into a focused arc beam. A shadow mask or aperture stop positioned in front of the reflector assures a beam such as would be radiated from a ring source.

3 Claims, 2 Drawing Figures

FOCUSED ARC BEAM TRANSDUCER-REFLECTOR

BACKGROUND OF THE INVENTION

The instant invention relates generally to acoustic transducers used in non-destructive materials testing and underseas applications and more particularly to a transducer and reflector combination which stimulates a focused-arc transducer which produces a line-focus sound beam characteristic of focused-arc transducers.

It is well known in the art of acoustical non-destructive testing that it is desirable to use a sharply focused beam of energy. Many methods have been tried including various shaped transducers and other beam focusing methods such as with acoustic lenses and the like, but none was completely satisfactory for a sharply focused beam.

It has been discovered that the radiation from an annular or ring-shaped transducer, which emits a hollow substantially cylindrical beam of energy, may be effectively and sharply focused along a line having great depth of field emanating from the transducer. This line focus has many advantages over a normal point focus, which is at a certain distance from the focusing apparatus.

Producing an annular or ring-shaped transducers is difficult particularly because the very narrow annulus must be made of separate piezo-electric elements that are selected to be matched in output in order to define a good focus of radiated energy and to minimize the effects of differences in the resonant frequency. This limits the acoustic power that may be transmitted and tends to introduce extraneous reasonances in the transducer.

In view of this difficulty it is desirable to be able to simulate a focused arc-shaped transducer with a simple disc transducer and reflectors or or refractors that can operate at high powers and produce a sharp focus over a great depth of field.

SUMMARY OF THE INVENTION

Accordingly, an object of the instant invention is to provide a new and improved acoustic transducer for non-destructive materials testing.

Another object of the present invention is to simulate an arc-shaped transducer with a simple disc transducer.

Still another object of the present invention is to provide a beam of acoustic energy capable of being sharply focused along a line emanating from a disc transducer.

A further object of the instant invention is to greatly simplify the construction and improve the performance of a focused arc-shaped transducers which have the property of being in sharp focus at essentially all ranges from the transducer.

Briefly these and other objects of the instant invention are attained by the use of one simple disc transducer radiating acoustic energy into a compound reflector to produce a real image or virtual image of a narrow annular coherent sound source. This arrangement simulates a focused arc-shaped transducer and is superior in performance as well as simplified in construction.

BRIEF DESCRIPTION OF THE DRAWINGS

A more complete understanding of the invention and many of the attendant advantages thereof will be readily appreciated as the same become better understood by reference to the following detailed description when considered in connection with the accompanying drawings wherein.

DESCRIPTION OF THE PREFERRED EMBODIMENT

Figure 1:
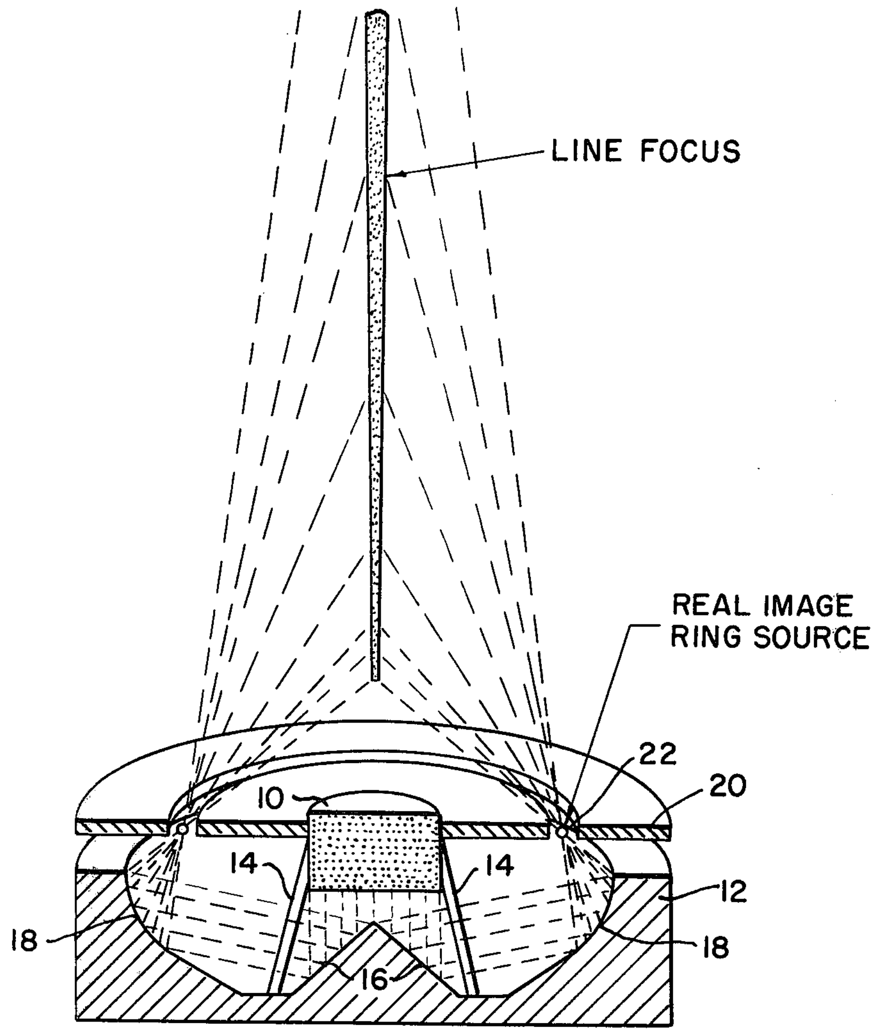
FIG. 1 is a cross-sectional view of a simulated focused arc transducer giving a real image.

Referring now to the drawings wherein like reference numerals designate corresponding parts throughout the several views, there is shown generally a transducer 10 radiating an acoustic signal to a circular reflector 12, made of stainless steel or the like.

The transducer 10 may be a simple disc or polygon transducer and made of a piezoceramic material. Referring particularly to FIG. 1 the transducer 10 is attached adjacent the open face of the reflector 12 by a plurality of struts 14 to maintain a precise relative orientation. A conical reflector surface 16, formed concentrically in the reflector 12, is shown subjacent to the transducer 10. Radially outward from the conical reflector surface 16, is a concave parabolic reflector surface 18 formed around the reflector 12. Supported by the transducer 10 and the struts 14 a slight distance in front of the reflector 12 is a disc having an annular slot therein thus forming an aperture stop 20 with the slot adjacent the parabolic reflector surface 18.

Figure 2:
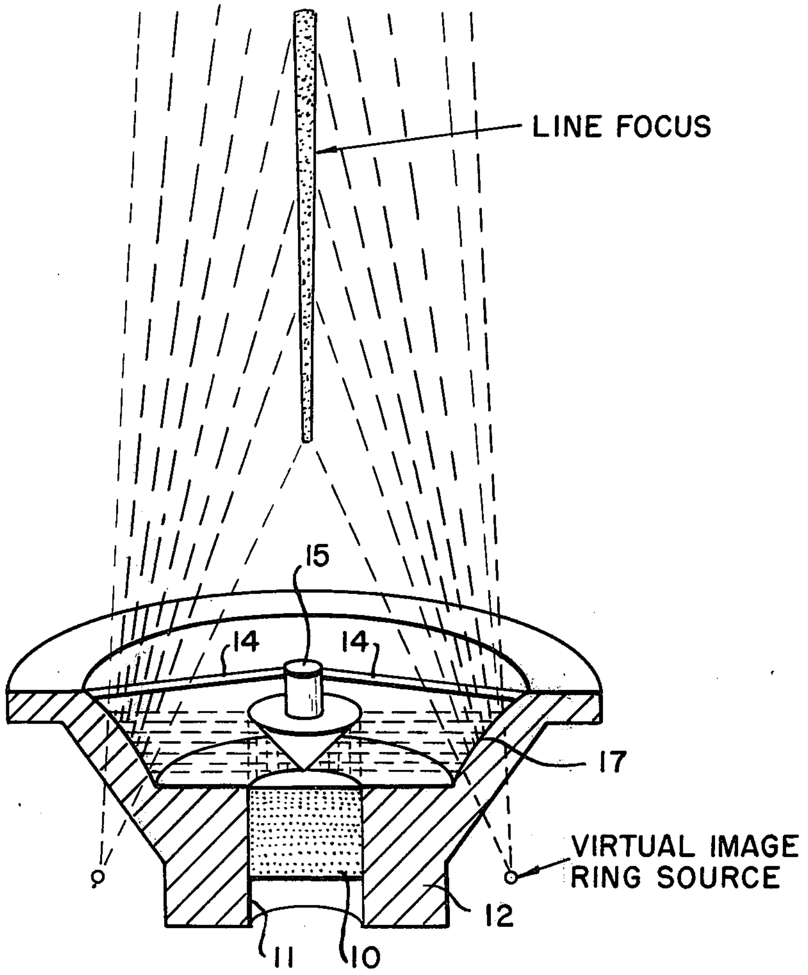
FIG. 2 is a cross-sectional view of a simulated focused arc transducer giving a virtual image.

Referring now to FIG. 2 the transducer 10 is mounted in a central bore 11 of the reflector 12, to radiate outwardly. A conical reflector surface 15 is separate from the reflector 12 but mounted thereto with a plurality of struts 14, and positioned directly in front of the transducer 10. Radially outward from the conical surface 15 is a convex parabolic or partial torus reflector surface 17 formed around the reflector 12.

The operation of the devices of FIG. 1 and FIG. 2 is substantially the same to produce the unique line-focus sound beam shown in both figures. It is to be understood that both the transducer-reflector and the test specimen are normally submerged in water in ultrasonic non-destructive testing. Referring to FIG. 2, in this cross-sectional drawing, plane waves are emitted from the transducer 10, which may be 1 to 2 inches in diameter. These plane waves travel through water to impinge on the conical reflector 15 made of stainless steel or the like. Here the waves reflect and are converted to a radially outward moving cylindrical wave. This cylindrical wave then reflects from the metallic reflector 17, which has the shape of a partial torus and is positioned coaxial with the conical reflector 15. The finally reflected wave is transformed into a wavefront the same as would have been radiated by a ring source at the location shown in FIG. 2 as a "virtual ring source", where the radiated diverging rays would converge behind the reflector 12. As has now become obvious, once it is realized that a plane wave front can be reshaped by the use of compound reflectors to form a focused-arc transducer beam, there are many other embodiments that would perform in the same manner.

FIG. 1 shows another such embodiment wherein the plane wave front from a disc transducer 10 is emitted toward the rear, and impinges on the conical reflector 16 having a half angle approximating 50° from its axis of symmetry to its surface of revolution, or in other words, an included angle of 100°. Here the reflection is an upward and outward moving slightly conical wavefront. This wavefront is then reflected by a parabolic surface of revolution or a paraboloid surface 18 that is positioned coaxial with the conical reflector. This paraboloid reflector is designed to accept the impinging conical wavefront and focus it in a narrow annular aperture 22. The wavefront is therefore transformed into a form such as would be radiated by a ring source at the location shown as the "real ring source" in the aperture 22.

In both embodiments the beam is projected to a sharp line of focus normal to the transducer and having a long depth of field and it is to be understood that the reflectors need not be a complete disc, but rather a segment of a disc would still produce the desired line focus. In fact a segment maybe used for transmitting and a segment for receiving.

Obviously many modifications and variations of the present invention are possible in light of the above teachings. It is therefore to be understood that within the scope of the appended claims, the invention may be practiced otherwise than as specifically described.

What is claimed is:

1. An acoustic transducer-reflector for simulating a focused-arc beam comprising:

a disc-shaped transducer mounted forward of and concentrically with the transducer-reflector for radiating a beam of acoustic wave energy rearward toward the reflector;

compound reflector means attached behind said disc transducer for producing an emitted wavefront simulating that which would be radiated by a ring source to produce a line focus with great depth of field, said reflector means including a conical reflector concentrically behind said transducer for reflecting the acoustic waves radially outward, and a surface of revolution reflector, made of a truncated parabola for simulating a real-image ring source, concentric with and positioned radially outward from said conical reflector; and an aperture stop disc with an annular slot positioned forward of and concentric with said surface of revolution reflector and in the focal plane of the real-image ring source.

2. The acoustic transducer-reflector of claim 1 wherein said conical reflector has a half-angle of approximately 50°.

3. The acoustical transducer-reflector of claim 2 further comprising:

a plurality of struts connecting said transducer to said reflector;

said transducer radiating its beam of acoustic wave energy rearwardly into said conical reflector; and said aperture stop disc attached to said transducer.

* * * * *